United States Patent [19]

Yaniger et al.

[11] Patent Number: 4,963,702
[45] Date of Patent: Oct. 16, 1990

[54] DIGITIZER PAD FEATURING SPACIAL DEFINITION OF A PRESSURE CONTACT AREA

[75] Inventors: Stuart I. Yaniger, Ventura; James P. Rivers, Santa Barbara, both of Calif.

[73] Assignee: Interlink Electronics, Inc., Carpenteria, Calif.

[21] Appl. No.: 308,706

[22] Filed: Feb. 9, 1989

[51] Int. Cl.[5] ............................................. G08C 21/00
[52] U.S. Cl. ........................................ 178/18; 178/20
[58] Field of Search ............................... 178/18, 19, 20

[56] References Cited

U.S. PATENT DOCUMENTS 4,208,648 6/1980 Naumann ............................... 178/18

Primary Examiner—Stafford D. Schreyer
Attorney, Agent, or Firm—Nilsson, Robbins, Dalgarn Berliner, Carson & Wurst

[57] ABSTRACT

A digitizer pad apparatus includes at least one digitizer ply where each digitizer ply has a first and a second resistor strip, each with a resistance gradient along its length, oriented in spaced apart relationship. A plurality of conductor traces are interconnected along the length of each resistor strip to extend toward and be interleaved between each other to define a sensor pad region. Each sensor pad region defines a dimensional direction. A shunt ply is positioned to face the sensor pad region in normally non-conducting relationship so that when a selected area is pressed into contact with the conductor traces, conduction between adjacent conductor traces via the shunt ply will occur in the selected contact area. The selected contact area has a first edge and a second edge opposite the first edge along the defined dimensional direction. A voltage source is coupled across the first resistor strip and a switch is coupled across the ends of the second resistor strip for alternately coupling one end and then the other end of the second resistor strip to a utilization. The voltage and hence the location of the first edge and then the second edge of the contact area along the dimensional direction is thereby determined.

20 Claims, 2 Drawing Sheets

DIGITIZER PAD FEATURING SPACIAL DEFINITION OF A PRESSURE CONTACT AREA

BACKGROUND OF THE INVENTION

The present invention relates to electronic pressure sensing devices and in particular to digitizer pads capable of locating the leading and trailing edges of a pressure contact area.

Digitizer pads and their function are well known. Examples of prior art digitizer pads are illustrated in Eventoff U.S. Pat. No. 4,739,299, issued Apr. 19, 1988 and Margolin U.S. Pat. No. 4,455,450, issued June 19, 1984. Digitizer pads of the above construction have generally had opposing conductor pads with solid or interleaved conductor traces to enable the X-Y or XYZ coordinates of the point of force application against the digitizer pad to be identified. In general, such digitizer pads have contemplated the use of a generally pointed instrument to apply force against the pad so that the pressure point would be very localized. However, in many applications the point of contact extends over an larger area in which many adjacent circuit traces are pressed into contacting relationship which results in ambiguities since there are multiple points of pressure application. In such a case; the measurement of the position of the force usually measures the position of the barycentric average of the force, that is $$<x> = \int x\, F(x)\, dx / \int F(x)\, dx$$

where $<x>$ is the measured force position, $F(x)$ is the distribution of force with position, and the integrals extend along the entire length of the position sensor. Naturally, this can be a measurement along a single coordinate axis, or along two perpendicular axes.

In some cases, however, it is desirable to measure the position of the leading or trailing edge of an object, rather than its barycentric position. This is useful for determining the size of an object, as well as a providing a dynamic means of measuring the object's position or motion.

The present invention addresses this problem by providing a digitizer pad which is capable of detecting both the leading and trailing edges bounding the area of pressure application on the digitizer pad in the spacial dimension defined by the orientation of the interleaved circuit traces so as to identify the bounds of the area of pressure application in that dimension. The digitizer pad apparatus in accordance with the invention may be made using one or more digitizer ply apparatus each with the interleaved circuit traces of each ply positioned in a predefined angular orientation relative to the traces of other plys. In one desired embodiment, the circuit traces of two digitizer ply structures are oriented orthogonal to one another in a plane. The resultant digitizer pad apparatus is an X-Y digitizer pad capable of locating the bounds of the areas over which the pressure is applied in both the X and Y dimensions. The amount of pressure applied can also be determined to define a "Z" dimension perpendicular to the plane of the X-Y plane in which the two digitizer ply structures are oriented, by utilizing a force sensing resistor ply such as that described in Eventoff, U.S. Pat. No. 4,739,299 issued Apr. 19, 1988 and Eventoff, U.S. Pat. No. 4,315,238, issued Feb. 9, 1982.

SUMMARY OF THE INVENTION

A digitizer pad apparatus in accordance with the invention includes one or more digitizer plies in a selected stacked orientation. Each digitizer ply includes a first resistor strip having a resistance gradient along its length and a second resistor strip in space apart relationship to the first resistor strip, also having a resistance gradient along its length. A plurality of first conductor traces are interconnected to the first resistor strip in spaced relationship along its length to extend into a sensor pad region toward the second resistor strip A plurality of second conductor traces are interconnected to the second resistor strip in spaced relationship along its length to extend into the sensor pad region toward the first sensor strip. The first and second conductor traces are interleaved but in con-contacting relationship with each other in the sensor pad region. The area of interleaved conductor traces defines the sensor pad region A shunt ply is positioned in normally non-conducting relationship over the sensor pad region.

The shunt ply is positioned for being pressed into contact against the first and second conductor traces in the sensor pad region to enable conduction between adjacent ones of the first and second conductor traces through the shunt ply in the selected contact area. The selected contact area is defined by a first edge and a second edge opposite the first edge along the dimension defined by the interleaved conductor traces of each digitizer ply.

In use, for each digitizer ply, a voltage source is coupled across the first resistor strip. A means is provided for alternately coupling a utilization circuit (e.g., a voltage measurement) to one end or the other of the second resistor strip. In a preferred embodiment, the end of the second resistor strip not connected to the utilization circuit is left floating. In another use, a two-conductor type utilization circuit may have its leads alternately switched between the two ends of the second strip. Accordingly, the voltage measured at the utilization means coupled to the one end will be a measure of the location on the sensor pad region of the first edge of the select contact area. Similarly, the voltage measured at the utilization means coupled to the other end will be a measure of the location of the second edge of the selected contact area opposite the first edge in a direction along the dimension defined by interleaved conductor traces of the digitizer ply in the sensor pad region.

The digitizer pad apparatus in accordance with the invention may include one or more digitizer plies, each aligned at a different angular orientation relative to one another. In addition, the shunt ply may comprise a pressure sensitive composition layer for providing a parameter measure orthogonal to the planes in which the conductor traces are aligned to provide a means of locating, on the sensor pad region, the location of the edges of the contact area in the dimensional direction defined by the interleaved conductor traces.

The pressure sensitive composition layer may be used to measure the total force in a direction normal to the plane defined by the interleaved conductive traces.

BRIEF DESCRIPTION OF THE DRAWINGS

A complete understanding of the present invention and of the above and other advantages and features thereof may be gained from a consideration of the following description of the preferred embodiments taken in conjunction with the accompanying drawings in which.

DETAILED DESCRIPTION

Figure 1A:
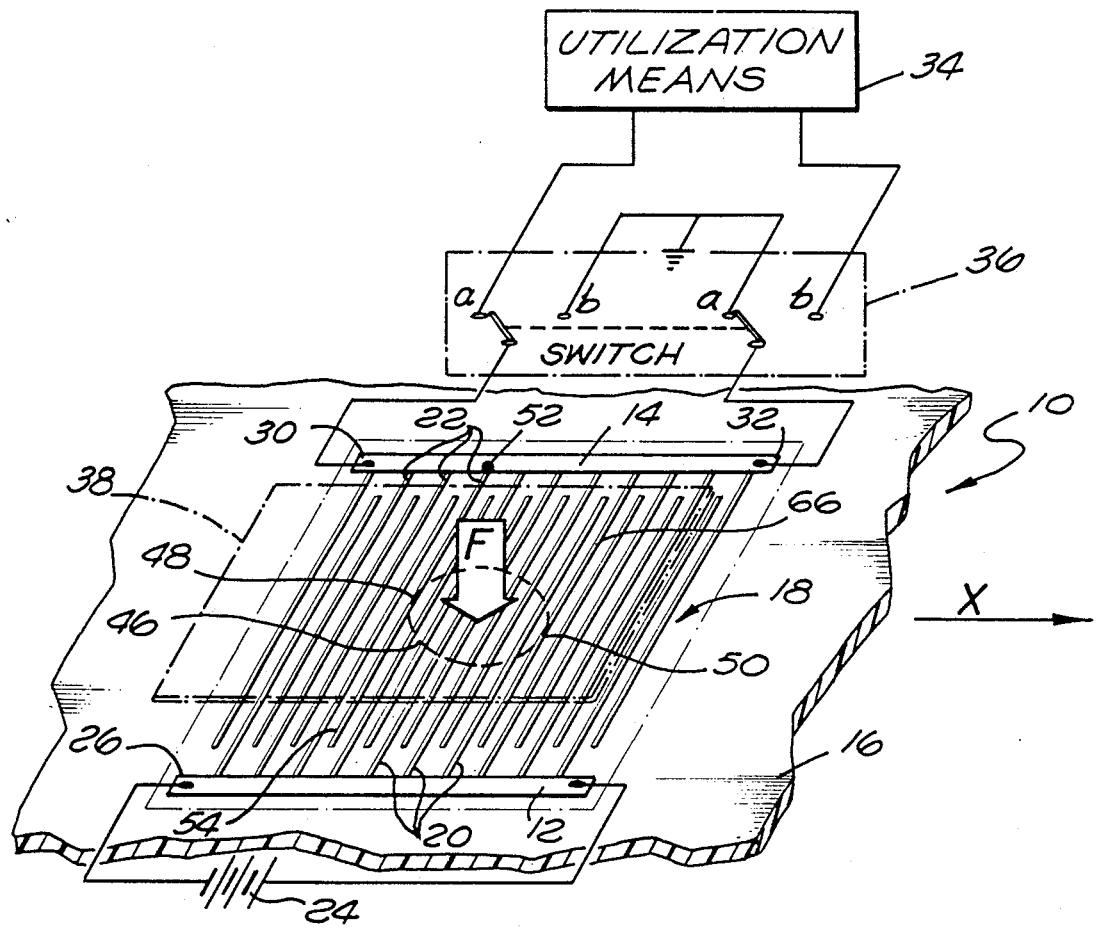
FIG. 1 is a schematic representation of a digitizer ply for use in a digitizer pad apparatus in accordance with the invention.
FIG. 1B is a side view illustrating the arrangement of the various components of the digitizer ply illustrated in FIG. 1A.

Referring first to FIG. 1, a simplified illustration of a digitizer ply 10 which may itself be used as a complete one dimensional digitizer pad apparatus or may be stacked to define a multidimensional digitizer pad apparatus includes a first resistor strip 12 and a second resistor strip 14 preferably disposed on a base ply 16 of suitable insulative material. The first resistor strip 12 and second resistor strip 14 are preferably in a geometrically parallel, spaced apart alignment with each other with the area between the first resistor strip 12 and second resistor strip 14 defining a sensor pad region 18. Of course, other relative orientations of the resistor strips and other than linear resistor strip configurations are possible and contemplated within the scope of the invention.

The first and second resistor strips 12 and 14 are made of any suitable material which will exhibit a resistance gradient along their length. Consequently, the resistance measured along one length of the resistor strips would be smaller than the resistance measured along a longer length of the resistor strips. The resistance gradient characteristics are preferably constant per unit length. However, variable resistance gradients or resistance gradients which are different at different locations along the length of the resistor strips are also possible Further, the gradient characteristics of the first resistor strip 12 need not be the same as the resistance gradient characteristics of the second resistor strip 14.

In a preferred embodiment, the resistance value of the resistor strip 12 to which the voltage is applied is about $\frac{1}{8}$ to 1/10 that of the resistor strip 14 to which the utilization means is connected. Further, the nominal force sensing resistance at a predefined desired force should be 3-10 times greater than the higher of the two fixed resistors.

A plurality of conductor traces 20 are interconnected to the first resistor strip 12 to extend generally perpendicularly therefrom toward the second resistor strip 14 into the sensor pad region 18. A plurality of second conductor traces 22 are similarly interconnected to the second resistor strip 14 to extend generally perpendicularly therefrom toward the first resistor strip 12 into the sensor pad region 18. The first conductor traces 20 and second conductor traces 22 are positioned to interleave one another in the sensor pad region 18 in non-contacting relationship both with each other and with the adjacent conductor traces between which each is interleaved.

The first resistor strip 12 has a first end 26 and a second end 28 with a voltage from a suitable voltage source 24 coupled between the first end 26 and the second end 28. The second resistor strip 14 similarly has a first end 30 and a second 32 which are alternately coupled to a utilization means 34 via a switch 36 which is switched between a first position "a" and a second position "b". More specifically, when the switch 36 is positioned in position "a" the first end 30 of the resistor strip 14 is coupled to the utilization means 34 and the second end 32 is left floating. When the switch 36 is positioned in position "b", the first end 30 is left floating and the second end 32 is coupled to the utilization means 34.

Finally, a shunt ply 38 is positioned in overlaying, normally non-conducting, relationship to the conductor traces 20 and 22 in the sensor pad region 18.

Figure 1B:
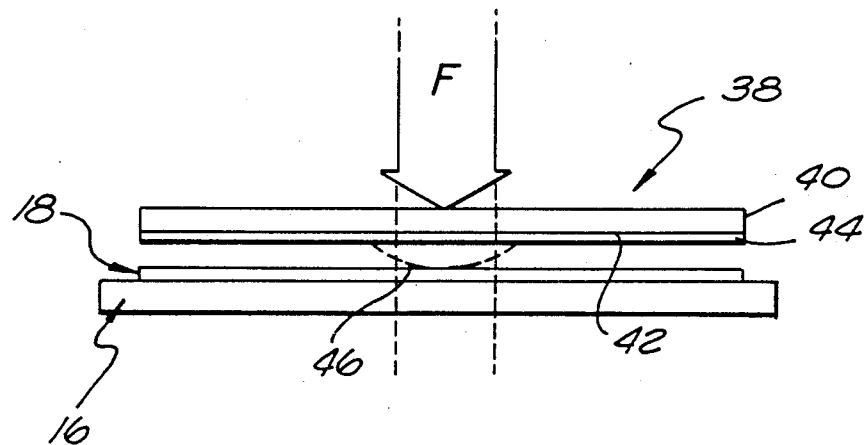

Referring to FIG. 1A in conjunction with FIG. 1B, the shunt ply 38 may be constructed using a insulative backing 40 such as mylar or other flexible plastic. The backing 40 has a surface 42 which is disposed in facing relationship to the interleaved first and second conductor traces 20 and 22 adjacent the sensor pad region 18. A shunt composition layer 44 is applied to the surface 42 for contacting the conductor traces in the sensor pad region 18 when a force F is applied to a selected area of the shunt ply. In one embodiment, the shunt composition layer may be a pressure sensitive composition ply such as that described in Eventoff, U.S. Pat. No. 4,315,238, issued Feb. 9, 1982, which patent is hereby incorporated by reference. Alternatively, the pressure sensitive ply can be conductive rubber or carbon-filled polyurethane.

In operation, the shunt ply 38 is pressed by an external pressing force F to cause the shunt composition layer 44 to contact a plurality of the first and second conductor traces 20 and 22 over a contact area 46 in the sensor pad region 18. The contact area 46 is bounded by a first edge 48 and a second edge 50 opposite the first edge 48 along the dimension "X" defined by the orientation of the interleaved conductor traces (generally the dimension will perpendicular to the direction in which the conductor traces extend)

In accordance with the invention, when switch 36 is switched to position "a" so that the first end 30 is coupled to the utilization means 34 and the second end 32 is left floating, the only location of contact on the sensor pad region 18 which will be sensed is the contact point made between the conductor trace 54, which is the left most of the first conductor traces 20 contacted by the shunt composition layer 44, and conductor trace 56, the left most of the second conductor traces 22 contacted by the shunt composition layer 44. More specifically, the resistance of the resistor strip causes the sensed position to be weighted toward the leftmost edge 48. Accordingly, it is preferable that the resistor strip 14 has approximately five times greater resistance than the resistor strip 12. This result occurs because the conduction path between the left most conductor traces contacted by the shunt composition layer 44 will be the path of least resistance through the resistor strips 12 and 14 hence yield the smallest voltage drop. The utilization means 34 will sense that voltage drop through the portion of the resistor strip 12 between the first end 26 and the conductor trace 54 and between the conductor trace 56 and the first end 30. The magnitude of that voltage will be proportional to the location along the sensor pad region in the X dimension of the first edge 48 of the contact area 46.

When the switch 36 is switched from position "a" to position "b" and the second end 32 is coupled to the utilization means 34. The voltage applied across the first resistor strip 12 will cause the voltage drop between the first end 26 and the conductor trace 60, the right most of the first conductor traces 20 contacted by the shunt composition layer 44 in the direction of the X dimension, and the conductor trace 66, the right most of the second conductor traces 22 contacted by the shunt composition layer 44 along the X direction in the contact area 46, and the second end 32 of the second resistor strip 14, to be detected at the utilization means. This voltage drop which will also be indicative of the spacial location of the second edge 50 of the contact area 46. Hence, the present invention provides a means of detecting the location of the opposite edges of a contact area 46 in a sensor pad region 18 along the X dimension.

The description of the invention as set forth in FIGS. 1A and 1B provide a means for detecting edge locations along a first (X) dimension perpendicular to the direction in which the first and second conductor traces 20 and 22 are oriented on the base ply 16. By stacking two such digitizer plys so that the circuit traces are substantially orthogonal to each other, a digitizer pad apparatus which can detect the edges of a contact area along two orthogonal dimensions, such as an X and Y dimension, are possible Furthermore, by incorporating as the shunt ply 44 a force sensing resistor ply such as that described in U.S. Pat. No. 4,315,238, and as more fully described in U.S. Pat. No. 4,739,299, an XYZ digitizer pad can be constructed where the magnitude of the pressing force (Z direction) can be obtained; the opposite edges of the contact area in a second dimension orthogonal to the direction of pressing force (for example, the X direction) can be identified; and lastly, the location of the two edges of the contact area in a third dimension orthogonal to both the Z and X dimensions (for example, the Y direction) can be obtained.

Figure 2:
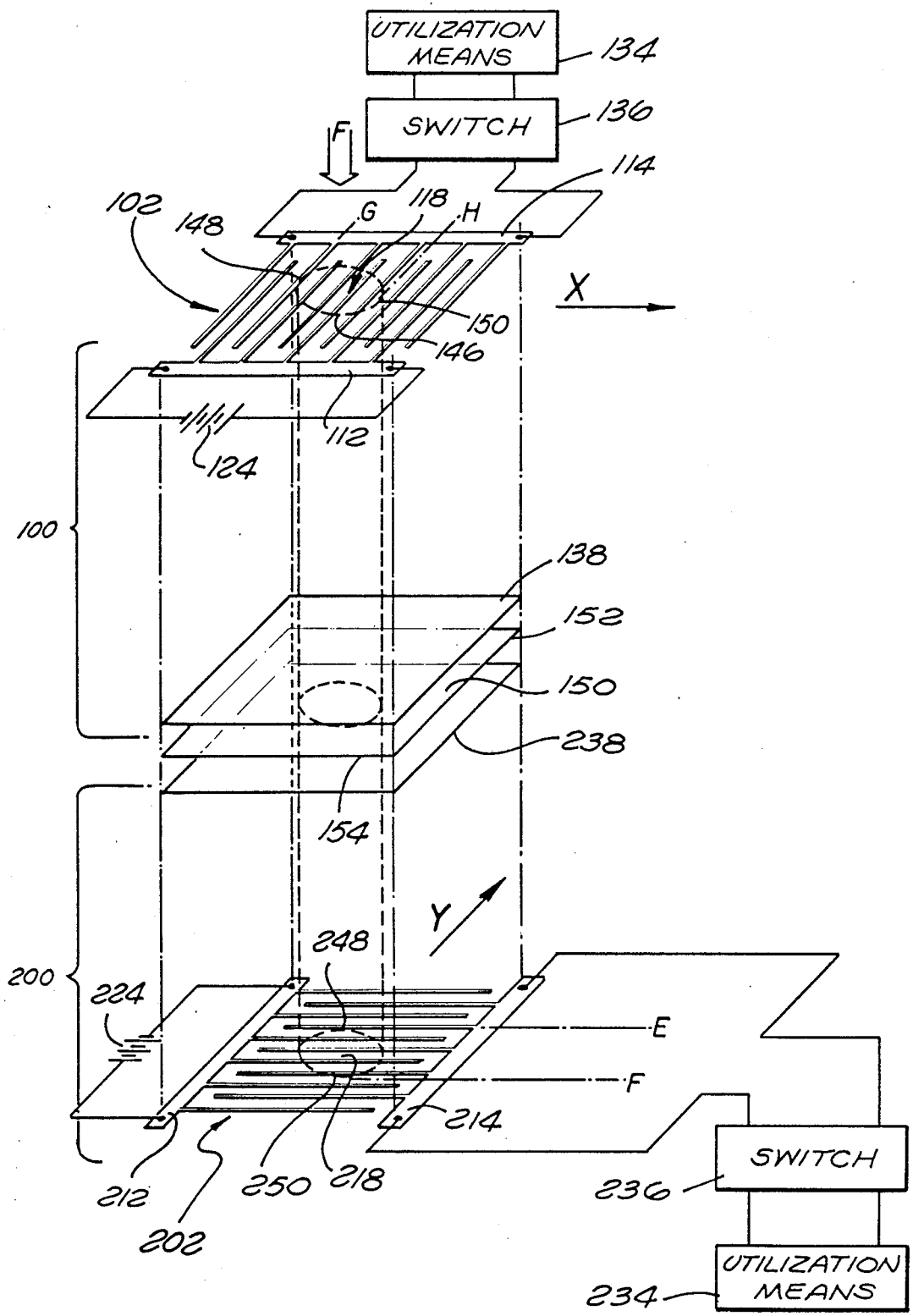
FIG. 2 is an exploded pictorial representation of a digitizer pad apparatus consisting of two digitizer plies in stacked configuration and oriented with circuit traces orthogonal to one another to provide edge sensing in the X and Y dimensional directions.

Referring to FIG. 2, an illustration of such an XYZ digitizer pad apparatus 90 in accordance with the invention having an X dimension digitizer ply 100 and a Y dimension digitizer ply 200 is illustrated. Both the X and Y dimension digitizer plys 100 and 200 are essentially the same as the digitizer ply illustrated and described in connection with FIGS. 1A and 1B. Accordingly, the X dimension digitizer ply 100 comprises a plurality interleaved conductor traces 102 alternately extending from a first resistor strip 112 and a second resistor strip 114 in the manner described in conjunction with Figure IA. A voltage source 124 is coupled across the ends of the first resistor strip 112 and a switch 136 and utilization circuit 134 coupled across the ends of the second resistor strip 114 in a manner such as that described in conjunction with Figure IA. A first shunt ply 137 comprising a shunt composition layer 138 disposed on one side 150 of an insulator ply 152, is juxtaposed in facing relationship to the sensor pad region 118 defined by the region in which the interleaved conductor traces 102 extend between the first and second resistor strips 112 and 114.

The second digitizer ply 200 similarly has a plurality of interleaved conductor traces 202 which extend from a first resistor strip 212 and a second resistor strip 214 to define a second sensor pad region 218 which preferably is aligned and coextensive with the first sensor pad region 118. A voltage from a second voltage source 224 is applied across the ends of the first resistor strip 212 with a switch 236 and utilization circuit 234 coupled across the ends of the second resistor strip 214 in the manner described in conjunction with FIG. 1A. A second shunt ply 237 comprising a second shunt composition layer 238 disposed on the other side 154 of the insulator ply 152 is juxtaposed in facing relationship to the sensor pad region 218 defined by the region in which the interleaved conductor traces 202 extend between the first and second resistor strips 212 and 214.

In the illustrated embodiment, the interleaved conductor traces 202 extend in a direction orthogonal to the direction in which the interleaved conductor traces 102 extend with each being essentially in the same plane. In operation, the utilization circuits 134 and 234 and the switches 136 and 236 interact and coordinate in any appropriate well known manner to determine the spacial location on the sensor pad region 118 of the edges 148 and 150 of a contact area 146 along the X dimension and to determine the spacial location on the sensor pad region 218 of the edges 248 and 250 of the contact area 246 in the manner describe in connection with Figure IA.

Both the first and second shunt composition layers 138 and 238 may be made of a force sensing resistor material Alternatively, only one or the other of the plies 138 and 238 may be made of a force sensing resistor material interconnected in any suitable manner such as that described in connection with U.S. Pat. No. 4,739,299 to obtain a measure of the pressure with which the Force F is applied to press the digitizer plys 100 and 200 together.

Of course, variations in the above illustrated embodiments are possible without departing from the present invention in its broadest aspects. For example, the digitizer plys 100 and 200 in FIG. 2 may be positioned at any angle relative to one another rather than simply at right angles. Furthermore, FIG. 2 shows a digitizer pad apparatus comprising two digitizer plys stacked relative to one another. However, more than two digitizer plys may be stacked together and positioned at different relative angles to provide a means of detecting the edges of a contact area in other directions rather than just the orthogonal X-Y dimensions. Accordingly, the following claims are intended to encompass all such modifications and alterations as fall within the true spirit and scope of the invention.

What is claimed is:

1. A digitizer pad apparatus comprising at least one digitizer ply, each digitizer ply comprising:
    a first resistor strip having a first end and a second end, the first resistor strip having a first resistance gradient along its length between the first end and the second end;
    a plurality of first conductor traces interconnected to the first resistor strip along its length and extending from the first resistor strip, the first conductor traces arranged in spaced apart relationship to each other;
    a second resistor strip having a third end and a fourth end, the second resistor strip having a second resistance gradient along its length between the third end and the fourth end;
    a plurality of second conductor traces interconnected to the second resistor strip along its length and extending from the second resistor strip, the second conductor traces arranged in spaced apart relationship to each other, the first and second conductor traces arranged in interleaved, non-contacting relationship to each other to define a sensor pad region and a dimensional direction in the sensor pad region;
    a shunt ply positioned adjacent to the sensor pad region but in normally non-conducting relationship thereto for having selected areas thereof pressed into contact with the first and second conductor traces to enable conduction between adjacent ones of the first and second conductor traces via the shunt ply in the selected contact area, the selected contact area defined by a first edge and a second edge opposite the first edge along the dimensional direction;

a voltage source coupled across the first and second ends of the first resistor strip;

means for intermittently coupling one of the third end to a utilization means and the fourth end to the utilization means, the voltage at the utilization means when the third end is coupled thereto being a measure of the location on the sensor pad region of the first edge of the selected contact area along the dimensional direction, the voltage at the utilization means when the fourth end is coupled thereto being a measure of the location on the sensor pad region of the second edge of the selected contact area along the dimensional direction.

2. The digitizer pad apparatus of claim 1, wherein the resistance gradient of the first and second resistor strips is constant per unit length.

3. The digitizer pad apparatus of claim 1 further comprising two digitizer plys.

4. The pad of claim 1 wherein the resistance of the second resistor strip along its length is between 3 and 10 times greater than the resistance of the first resistor strip along its length.

5. The digitizer pad apparatus of claim 1 wherein the shunt ply comprises:
an insulative ply having a first surface; and
a shunt composition layer disposed on the first layer for being juxtaposed in facing relationship to the first and second conductor traces in the sensor pad region.

6. The digitizer pad apparatus of claim 5 wherein the shunt composition layer is a force sensing composition layer.

7. The digitizer pad apparatus of claim 5 wherein the shunt composition layer is a conductive layer.

8. The digitizer pad apparatus of claim 1 wherein the means for intermittently coupling comprises a switch.

9. The digitizer pad apparatus of claim 1 wherein the first and second conductor traces are parallel to each other and are straight.

10. The digitizer pad apparatus of claim 1 wherein the first and second conductor traces alternate with each other in the interleaved arrangement.

11. The digitizer pad apparatus of claim 1 wherein the first and second resistor strips are parallel to each other and are straight.

12. The digitizer pad apparatus of claim 1 wherein there are two digitizer plys stacked with their respective conductor traces in predefined angular non-orthogonal orientation.

13. A digitizer pad apparatus comprising:
a first ply of interleaved conductor traces having an orientation defining a first dimension;
a second ply of interleaved conductor traces having an orientation defining a second dimension;
a third ply comprising an insulator layer having a first surface and a second surface opposite the first surface, a first shunt composition layer disposed on the first surface and a second shunt composition layer disposed on the second surface, the third ply positioned between the first ply and the second ply with the first shunt layer juxtaposed facing the first ply and the second shunt layer juxtaposed facing the second ply;

the first ply comprising:
a first resistor strip having a first end and a second end, the first resistor strip having a first resistance gradient along its length between the first end and the second end;
a plurality of first conductor traces interconnected to the first resistor strip along its length and extending from the first resistor strip, the first conductor traces arranged in spaced apart relationship to each other;
a second resistor strip having a third end and a fourth end, the second resistor strip having a second resistance gradient along its length between the third end and the fourth end;
a plurality of second conductor traces interconnected to the second resistor strip along its length and extending from the second resistor strip, the second conductor traces arranged in spaced apart relationship to each other, the first and second conductor traces arranged in interleaved, non-contacting relationship to each other to define a first dimension sensor pad region;
the first shunt composition layer positioned adjacent to the first dimension sensor pad region but in normally non-conducting relationship thereto for having selected areas thereof pressed into contact with the first and second conductor traces to enable conduction between adjacent ones of the first and second conductor traces through the first shunt layer in the selected contact area, the selected contact area defined by a first edge and a second edge opposite the first edge along the first dimension;
a first voltage source coupled across the first and second ends of the first resistor strip;
first means for intermittently coupling one of the fourth end to a utilization means and the third end to the utilization means, the voltage at the utilization means when the fourth end is coupled thereto being a measure of the location on the first sensor pad region of the first edge of the selected contact area, the voltage at the utilization means when the third end is coupled thereto being a measure of the location on the first sensor pad region of the second edge of the selected contact area;

the second ply comprising:
a third resistor strip having a first end and a second end, the third resistor strip having a third resistance gradient along its length between the first end and the second end;
a plurality of third conductor traces interconnected to the third resistor strip along its length and extending from the third resistor strip, the third conductor traces arranged in spaced apart relationship to each other;
a fourth resistor strip having a third end and a fourth end, the fourth resistor strip having a fourth resistance gradient along its length between the third end and the fourth end;
a plurality of fourth conductor traces interconnected to the fourth resistor strip along its length and extending from the fourth resistor strip, the fourth conductor traces arranged in spaced apart relationship to each other, the third and fourth conductor traces arranged in interleaved, non-contacting relationship to each other to define a second sensor pad region;

the second shunt layer positioned adjacent to the second sensor pad region but in normally non-conducting relationship thereto for having selected areas thereof pressed into contact with the third and fourth conductor traces to enable conduction between adjacent ones of the third and fourth conductor traces through the second shunt layer in the selected contact area, the selected contact area defined by a third edge and a fourth edge opposite the third edge along the second dimension;

a second voltage source coupled across the first and second ends of the third resistor strip;

second means for intermittently coupling one of the fourth end to the utilization means and the third end to the utilization means, the voltage at the utilization means when the fourth end is coupled thereto being a measure of the location on the second sensor pad region of the third edge of the selected contact area, the voltage at the utilization means when the third end is coupled thereto being a measure of the location on the second sensor pad region of the fourth edge of the selected contact area.

14. The digitizer pad apparatus of claim 13, wherein the resistance gradient of each of the resistor strips is constant per unit length.

15. The digitizer pad apparatus of claim 13 wherein at least one of the first and second shunt composition layers is a force sensing composition layer.

16. The digitizer pad apparatus of claim 13 wherein at least one of the first and second shunt composition layers is a conductive layer.

17. The digitizer pad apparatus of claim 13 wherein the first and second means each comprise a switch.

18. The digitizer pad apparatus of claim 13 wherein the first and second conductor traces are parallel to each other and are straight and the third and fourth conductor traces are parallel to each other and are straight 19. The digitizer pad apparatus of claim 13 wherein the first and second resistor strips are parallel to each other and are straight and the third and fourth resistor strips are parallel to each other and are straight.

20. A digitizer pad apparatus comprising at least one digitizer ply, each digitizer ply comprising:

a first resistor strip having a first end and a second end, the first resistor strip having a first resistance gradient along its length between the first end and the second end;

a plurality of first conductor traces interconnected to the first resistor strip along its length and extending from the first resistor strip, the first conductor traces arranged in spaced apart relationship to each other;

a second resistor strip having a third end and a fourth end, the second resistor strip having a second resistance gradient along its length between the third end and the fourth end;

a plurality of second conductor traces interconnected to the second resistor strip along its length and extending from the second resistor strip, the second conductor traces arranged in spaced apart relationship to each other, the first and second conductor traces arranged in interleaved, non-contacting relationship to each other to define a sensor pad region and a dimensional direction in the sensor pad region;

a shunt ply positioned adjacent to the sensor pad region but in normally non-conducting relationship thereto for having selected areas thereof pressed into contact with the first and second conductor traces to enable conduction between adjacent ones of the first and second conductor traces via the shunt ply in the selected contact area, the selected contact area defined by a first edge and a second edge opposite the first edge along the dimensional direction;

a voltage source coupled across the first and second ends of the first resistor strip;

utilization means coupled to the second resistor strip for measuring voltages thereat, the voltages being measures of the location on the sensor pad region of the first and second edges of the selected contact area along the dimensional direction.

* * * * *

UNITED STATES PATENT AND TRADEMARK OFFICE
CERTIFICATE OF CORRECTION

PATENT NO. : 4,963,702
DATED : October 16, 1990
INVENTOR(S) : Stuart I. Yaniger, James P. Rivers It is certified that error appears in the above-identified patent and that said Letters Patent is hereby corrected as shown below:

Column 2, line 12, insert --.-- after "strip".

Column 2, line 21, insert --.-- after "region".

Column 3, line 40, insert --.-- after "possible".

Column 5, line 24, insert --.-- after "possible".

Column 5, line 46, delete "IA" and substitute therefor --1A--.

Column 5, line 51, delete "IA" and substitute therefor --1A--.

Column 6, line 17, delete "IA" and substitute therefor --1A--.

Column 6, line 20, insert --.-- after "material".

Column 9, line 43, insert --.-- after "straight".

Signed and Sealed this

Fifth Day of May, 1992

*Attest:*

DOUGLAS B. COMER

*Attesting Officer*    *Acting Commissioner of Patents and Trademarks*